May 8, 1962 J. DE BOOYS ETAL 3,032,821
PROCESS FOR MANUFACTURING THERMOPLASTIC GRANULES
Filed June 29, 1960
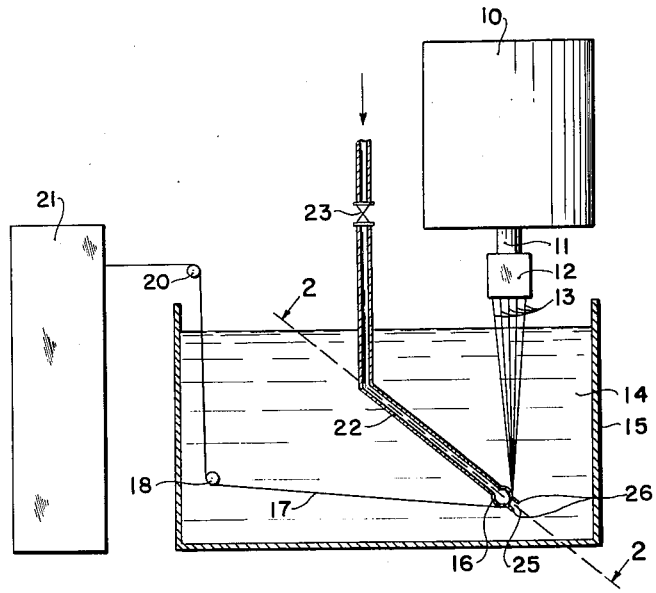
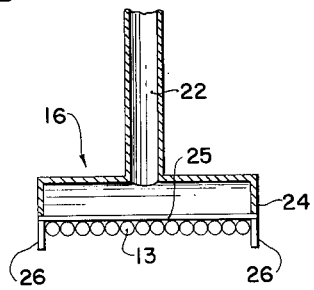
JACOB DE BOOYS
JACOBUS LEENDERT TIMMERS
*INVENTORS.*
BY
*Francis W. Young*
ATTORNEY 3,032,821
PROCESS FOR MANUFACTURING
THERMOPLASTIC GRANULES
Jacob de Booys and Jacobus Leendert Timmers, Emmen, Netherlands, assignors to American Enka Corporation, Enka, N.C., a corporation of Delaware
Filed June 29, 1960, Ser. No. 39,639
Claims priority, application Netherlands Aug. 7, 1959
2 Claims. (Cl. 18—47.5)

This invention relates generally to a process for the manufacture of thermoplastic granules and more particularly to a process for forming granules of organic thermoplastic polymeric materials.

This process is applicable generally to polymers which are fusible in substantially pure conditions, are extrudable from the melt, have a crystalline or micro-crystalline character and may be molecularly orientable upon stretching. Some polymers having these characteristics are, for example, polycaprolactam, polyhexamethylene-adipamide, polyhexamethylene-sebacamide, linear polyesters of glycols such as ethylene glycol and terephthalic acid, homopolymers of acrylonitrile, heteropolymers containing combined acrylonitrile and polypropylene.

It has been proposed to convert such polymers into granules or chips for use in melt spinning processes by extruding filaments of polymer from the melt, cooling the filaments and cutting them into short cubical pieces. This process requires that the filaments be kept cool enough to prevent stickiness and at the same time be kept hot enough to reduce irregular breakage and shattering which results in non-uniformity and fines. The filaments are thus cooled to just below their solidification point.

It has also been proposed in U.S. Patent No. 2,834,053 that greater uniformity of granules and reduction of fines may be obtained by extruding the filaments into an inert cooling liquid. Thereafter, the filaments are gathered into side-by-side contact to form a ribbon. The surface temperature of the filaments at the time of contact is below the weld temperature, i.e. the temperature at which fusion occurs, and coalescence between filaments will develop immediately at all adjacent areas. However, the average temperature at this point remains in the plastic range, i.e. the range in which the filaments adhere while maintaining their individual identity.

The ribbon is then passed through the cooling liquid at least until it solidifies into a connected structure, preferably until the temperature at the points of contact has been reduced below the plastic range. The resulting filament ribbon is then passed to a cutter which severs the free end thereof and breaks the lateral bonds between the filaments, thereby forming granules.

A major disadvantage of this process is the critical control which must be maintained to provide the desired filament adhesion. If adhesion is not sufficiently strong, the ribbon may break before it reaches the cutter thereby resulting in non-uniform granules. If the adhesion is too strong, the granules from adjacent filaments will stick together after the free end of the filament has been cut. These granules thus may cause clogging of the grids or extruders in future processing.

It has been proposed that these difficulties may be overcome by varying the temperature of the cooling liquid and/or by varying the point at which the filaments are gathered into side-by-side contact. Clearly such changes require complicated and expensive equipment. In addition, they require very close control which adds materially to the cost of the operation.

It is, therefore, an object of the present invention to provide a simple and inexpensive process for the production of organic thermoplastic polymer granules.

It is a further object of this invention to provide a process for the production of granules of organic thermoplastic polymeric materials that are free of the difficulties of the prior art.

A further object of this invention is to provide a process for the production of substantially uniform organic thermoplastic polymer granules.

Another object of this invention is to provide a process for the production of granules of thermoplastic polymeric materials wherein the production of fines is substantially reduced.

These and other objects of the present invention will become apparent to one skilled in the art from a reading of the following detailed description taken in conjunction with the drawing in which:

FIGURE 1 is a diagrammatical side view of one embodiment of the apparatus according to this invention, FIGURE 2 is a cross sectional view of one part of the apparatus which view is taken along lines 2—2 of FIGURE 1.

It has been found that the objects of this invention may be accomplished by directing a current of cooling liquid transversely across the thermoplastic polymer filaments at the point at which they are brought into side-by-side contact to form a ribbon. This results in a sudden and forceful cooling of the filaments, thereby localizing the adhesion of the filaments and causing them to adhere suddenly.

This process contemplates in its entirety the extrusion of molten organic thermoplastic polymer such as polycaprolactam into separate, rounded, essentially uniform, non-molecularly oriented filaments into an inert cooling liquid. There the submerged filaments are cooled to a surface temperature at which they adhere, while maintaining their individual identity, by passing the same through a portion of the cooling liquid.

The filaments are then gathered into side-by-side contact forming a ribbon. It is preferred that only one layer of filaments be formed into a ribbon, however, more than one may be formed if desired without departing from the spirit and scope of this invention. At this point of gathering, a current of cooling liquid is directed transversely across the filaments to solidify the thus formed ribbon into a connected structure.

The resulting filament ribbon is drawn through the cooling liquid and withdrawn from the same by a pair of feed rolls. The advancing end of the ribbon is severed by any conventional granule or chip cutter. The speed of the feed rolls preferably is coordinated with the rate of filament extrusion so that tension sufficient to substantially molecularly orient the filaments by stretching does not develop. Unoriented filaments cut and break apart better than oriented filaments.

The cutter breaks the lateral bonds between individual filaments beyond the cutting block at the same time it cuts them transversely, thereby forming granules. This solves the problem of uneven feed of filaments to the cutter because the filaments adhere until they pass into the cutter.

The degree of adhesion may be controlled by varying the quantity of cooling liquid directed transversely across the filament bundle. Thus, adhesion is controlled without the necessity for adjusting the temperature of the liquid nor the point at which the filaments are gathered into side-by-side contact. The adhesion accomplished by this invention is more uniform than that heretofore obtained. This process also prevents the formation of adhered granules and at the same time insures that the filaments adhere to each other properly until they reach the cutter.

The cooling liquid may be any liquid that is inert to the thermoplastic polymer. It is preferably water which is maintained at about room temperature.

The point in the travel of the filaments through the cooling liquid at which they are gathered may be at any place in the liquid so long as the filament surface has reached a temperature below the weld temperature. It has proved satisfactory according to this invention to divert the movement of the filaments through the liquid and at the same time gather them into side-by-side contact and contact them with the cooling liquid as indicated above. This results in a substantial reduction in the cooling zone from that of the patented method which requires a diversion of the filament travel and gathering of the filaments at some point later in their travel. The latter system requires a relatively large and long cooling bath. A further advantage of this invention is that the transversal current of cooling liquid serves as a lubricating film for the filaments as they pass over the filament guide or diverting guide.

This process also insures that the solidified skin or surface of the filaments are sufficiently thick to withstand damage. In the prior art, the skin is very thin and may be damaged by stripping at the guides. This often causes the weak core to flow out into the bath with the result that the filaments either stick in the cutter or non-uniform granules are produced. In addition, this process reduces the consumption of cooling liquid.

As pointed out previously, this invention also relates to an apparatus for the production of substantially uniform granules of organic thermoplastic polymeric materials. This apparatus comprises a conventional granule or chip forming device which has been modified according to this invention.

This invention contemplates a spinning head connected to a source of supply of molten thermoplastic polymer and provided with a spinning plate of conventional design. The spinning plate or die will contain several orifices, the number of which depends upon the number of filaments desired.

The spinning plate is positioned over one end of a container of cooling liquid. This container of cooling bath has positioned therein a plurality of filament contacting guides. The first guide normally diverts the passage of filaments through the bath and the second may also divert filament passage, or it may have positioned on its thread contacting surface guides which gather the filaments into side-by-side contact forming a ribbon.

At the point of filament gathering into side-by-side contact, a supply line for cooling liquid is provided. This supply line directs fresh cooling liquid transversely across the filaments to cool and solidfy them into a connected ribbon.

The filament contacting apparatus which gathers the filaments into a ribbon may be constructed in several different ways. For instance, it may consist of a cylindrical bar on the filament contacting surface on which are longitudinally placed a plurality of guides. These guides, usually two in number, are positioned so as to bring the filaments into side-by-side contact. This filament contacting guide may also be a grooved or hollow bar. In addition, the guides on the bar may be movably positioned on the bar to permit variations in the number of filaments and width of the ribbon.

The liquid supply line may also be constructed in a variety of ways. For instance, it may consist of a longitudinal nozzle positioned over the filaments. In addition, it may be connected to a hollow filament contacting guide having a longitudinal opening therein to permit the passage of cooling liquid therethrough and against the filaments.

In the preferred embodiment of this invention, the first filament contacting guide serves multiple purposes. It first serves to divert the passage of filaments through the cooling liquid. Secondly, it serves to gather the filaments into side-by-side contact, and thirdly, it serves to direct the supply of cooling liquid transversely across the filaments at the point of gathering. Thus, this first filament contacting guide is located in a vertical direction from the spinning head. Such a preferred apparatus makes it possible to modify existing equipment in a simple manner, at small additional expense, and with a minimum of additional equipment.

After leaving the gathering point, the ribbon is passed a short distance through the bath and then withdrawn. In this passage, it may again have its travel diverted by a filament contacting guide. The ribbon is withdrawn by a pair of rollers which operate at substantially the speed of extrusion. Thereafter, the ribbon passes to a conventional cutter which severs the same into granules.

The following is a detailed description of one embodiment of this invention which is described with reference to the drawings.

Referring now to FIGURE 1, reference numeral 10 denotes a polymerization vessel from which molten thermoplastic polymer is extruded through spinning head 12 by way of duct 11 connecting the spinning head and polymerization vessel. Spinning head 12 comprises a pump unit and a spinning plate containing a plurality of orifices (not shown). The pump forces the molten polymer through the orifices in the form of filaments 13.

The filaments 13 enter cooling bath 14 contained in vessel 15 and pass around filament contacting guide 16, which guide is set at a point in bath 14 where the filament surface has been cooled below the weld temperature.

Filaments 13 are gathered into side-by-side contact by guide 16 and a current of cooling liquid is directed transversely across them at this point to form a connected ribbon. Ribbon 17 is then passed around ribbon contacting guide 18 positioned in bath 14 and guide 20 positioned outside of bath 15. Thereafter, ribbon 17 is passed to a conventional granule cutter 21 wherein the free end of ribbon 17 is severed and the same is broken into granules. Cutter 21 is of conventional design and has been illustrated diagrammatically only, but contains a pair of rollers (not shown) which operate to pull ribbon 17 and filaments 13 through and out of bath 14. They are operated at substantially the speed of extrusion in order that the filaments and ribbon will not be stretched or oriented appreciably.

The cooling liquid which is directed transversely across the filaments to chill or cool the same suddenly and form them into a connected ribbon, is supplied to filament contacting guide 16 by supply line 22. A control valve 23 is provided in line 22 in order to provide a control for the amount of cooling liquid or water passing through the same.

Filament contacting guide 16 comprises a hollow tube 24 closed at both ends and, as is more clearly shown in FIGURE 2, in open connection with supply line 22. A longitudinal opening 25 is provided at the filament contacting surface of guide 16 through which cooling liquid is forced transversely across filaments 13. On both sides of opening 25 and on both ends of tube 24, pins 26 are positioned tranversely to the tube. Pins 26 are spaced so as to force the filaments 13 into side-by-side contact in order that they may be gathered into a ribbon at their point of contact with the transverse movement of the cooling liquid from line 22. The longitudinal distance between pins 13 corresponds to the width of the ribbon which will be formed when the filaments are gathered into side-by-side contact.

The flow of water through line 22 is adjusted so that the filaments adhere slightly to each other. Thus, by varying the water supply, it is possible to efficiently control the degree of adhesion of filaments 13.

The above-described process and apparatus produces granules of organic thermoplastic polymeric material, especially polycaprolactam, which exhibits a large degree of uniformity in all dimensions. In addition, the uniformity of melting points and crystallization are also improved.

It should be understood that various modifications may be made in this invention without departing from its spirit and scope. For instance, the point at which the filaments are gathered may be at the second filament contacting guide. Also, the pins which serve to force the filaments in side-by-side contact need not be rigidly mounted on the guide, but may be movably mounted in order to accommodate ribbons of varying width. Therefore, it should be understood that this invention is to be limited only to the extent set forth by the following claims.

What is claimed is:

1. In a process for forming granules of organic thermoplastic polymer wherein molten organic thermoplastic polymer is extruded as filaments into an inert cooling liquid, cooled to a surface temperature at which the filaments adhere while maintaining their individual identity, gathered into side-by-side contact in a ribbon, and withdrawn prior to severing, the improvement comprising the step of directing a stream of cooling liquid transversely across said filaments immediately upon gathering into ribbon form.

2. A process for forming granules of polycaprolactam which comprises extruding molten polycaprolactam in the form of filaments, passing said filaments into an inert cooling liquid, altering the passage of said filaments through said liquid, gathering said filaments into side-by-side contact in a ribbon at said alteration of passage, directing a stream of cooling liquid transversely across said filaments at said alteration of passage to solidify said ribbon into a connected structure, passing said ribbon through said cooling liquid, removing said ribbon from said liquid, and thereafter passing the same to a cutter which severs the free end thereof and breaks the severed strip into separate granules.

References Cited in the file of this patent

UNITED STATES PATENTS

| | | |
|---|---|---|
| 2,036,174 | Hoffman | Mar. 31, 1936 |
| 2,834,053 | Bilanin et al. | May 13, 1958 |
| 2,862,243 | Farr et al. | Dec. 2, 1958 |